(12) United States Patent
Farries

(10) Patent No.: US 7,167,650 B2
(45) Date of Patent: Jan. 23, 2007

(54) METHOD AND APPARATUS FOR DEMULTIPLEXING HIGH BIT RATE OPTICAL SIGNALS ON DENSE WAVELENGTH GRID

(75) Inventor: Mark Farries, Exeter (GB)

(73) Assignee: JDS Uniphase Inc., Torquay (GB)

( * ) Notice: Subject to any disclaimer, the term of this patent is extended or adjusted under 35 U.S.C. 154(b) by 869 days.

(21) Appl. No.: 09/886,998

(22) Filed: Jun. 25, 2001

(65) Prior Publication Data
US 2002/0001114 A1 Jan. 3, 2002

(51) Int. Cl.
*H04J 14/00* (2006.01)

(52) U.S. Cl. .......................... 398/75; 398/79; 398/82; 398/84; 398/85; 398/87; 398/91; 398/98; 385/24; 385/37

(58) Field of Classification Search ............... 359/139; 398/82, 75, 79, 84, 85, 87, 91, 98; 385/24, 385/37
See application file for complete search history.

(56) References Cited

U.S. PATENT DOCUMENTS 5,652,814 A * 7/1997 Pan et al. ..................... 385/24
5,710,649 A * 1/1998 Mollenauer ................... 398/75
6,118,564 A * 9/2000 Ooi et al. ...................... 398/35
6,205,268 B1 * 3/2001 Chraplyvy et al. ........... 385/24
6,782,203 B1 * 8/2004 Lin et al. ....................... 398/82

* cited by examiner

*Primary Examiner*—Hanh Phan
(74) *Attorney, Agent, or Firm*—Matthew A. Pequignot; Hall, Vande Sande & Pequignot, LLP

(57) ABSTRACT

A method and an apparatus are provided to demultiplex an optical signal having a plurality of channels at a predetermined channel spacing having demultiplexing means with a frequency spacing larger than the predetermined channel spacing for receiving the optical signal and for dividing the optical signal by wavelength into a plurality of wavelength streams broader than the predetermined channel spacing, time domain demultiplexing means for receiving one of the plurality of wavelength streams and for dividing the one of the plurality of wavelength streams into a plurality of time domain demultiplexed wavelength streams, and optical filtering means for demultiplexing one of the plurality of time domain demultiplexed wavelength streams into a single channel. Advantageously, splitting means are provided to split the optical signal into sub-signals before launching them into the demultiplexing means.

17 Claims, 3 Drawing Sheets

US 7,167,650 B2

METHOD AND APPARATUS FOR DEMULTIPLEXING HIGH BIT RATE OPTICAL SIGNALS ON DENSE WAVELENGTH GRID

FIELD OF THE INVENTION

The present invention relates to a method and an apparatus for demultiplexing high bit rate optical signals on a dense wavelength grid.

BACKGROUND OF THE INVENTION

In optical communications, wavelength division multiplexing (WDM) is used for increasing the transmission capacity of a single optical fibre. The vast expansion in demand for communications bandwidth is pushing fibre transmission technology to its physical limits. Increased transmission capacity is obtained by increasing the transmission data rate through the fibre. Current transmission data rates are approaching the limits of opto-electronic components. Increased transmission capacity is also obtained by reducing the channel frequency spacing in a WDM optical fibre link. Such WDM links are referred to as DWDM (Dense Wavelength Division Multiplexing) because the density of the wavelength channels per unit wavelength is higher than in conventional WDM. The use of both higher data rates and closer channel spacing puts severe demands on the performance of the optical demultiplexer which can limit the optical capacity of the transmission link. For example, in current WDM links, the optical signals are transmitted at 10 Gbit/s on wavelength channels spaced at frequency intervals of 100 GHz. It is planned to increase the data rate to 40 Gbit/s, which concomitantly increases the bandwidth of the wavelength channel. The result is that in the wavelength domain, the linewidths of adjacent wavelength channels overlap making it difficult to demultiplex the individual wavelength channels without incurring an unacceptable loss in data information.

To better appreciate the problems consider the following. As the modulation bit rate is increased from 10 GHz to 40 GHz, the bandwidth $\Delta B$ of a channel signal increases; the relationship between the light pulse width $\Delta t$ and signal bandwidth $\Delta B$ is $\Delta t = 1/\Delta B$. In the case of a 40 GHz signal using a RZ (return to zero) modulation format, the separation between the pulses is 25 ps, but the pulse width, $\Delta t$, is only 12.5 ps and consequently, the modulation bandwidth $\Delta B$ is 80 GHz. The minimum modulated bandwidth of these signals is 60 GHz. Thus theoretically, wavelength channels transmitting data at 40 GHz could be multiplexed together onto a DWDM link in which the frequency separation is only 100 GHz. However, the theoretical capacity of the WDM link is limited by the band pass and the environmental stability of the optical filters used in demultiplexing. The available filter pass-band is determined by the figure of merit, which is defined as the bandwidth at the 0.5 dB point divided by the bandwidth at the 25 dB point and this is typically 0.4 to 0.5. Thus a high quality optical filter that could be used to demultiplex the DWDM signals have a measured pass bandwidth of 50 GHz and net bandwidth of only 25 GHz. Misalignment of the filter wavelength to the signal wavelengths due to manufacturing tolerances and environmental factors such as ageing will reduce the available bandwidth even further. Thus, demultiplexing this optical signal using prior art techniques would result in unacceptable error rates and data loss.

It is an object of the invention to provide a demultiplexer capable of demultiplexing high bit-rate optical signals.

It is a further object of the invention to provide a demultiplexer capable of demultiplexing optical signals in which the linewidths of adjacent channels overlap in the wavelength domain.

It is a further object of the invention to provide a low loss high bit-rate demultiplexer.

It is another object of the invention to provide a high bit-rate demultiplexer having a low error rate.

SUMMARY OF THE INVENTION

In accordance with the invention there is provided an optical demultiplexer for demultiplexing an optical signal having a plurality of channels at a predetermined channel spacing comprising demultiplexing means having a frequency spacing larger than the predetermined channel spacing for receiving the optical signal and for dividing the optical signal by wavelength into a plurality of wavelength streams broader than the predetermined channel spacing, time domain demultiplexing means for receiving one of the plurality of wavelength streams and for dividing the one of the plurality of wavelength streams into a plurality of time domain demultiplexed wavelength streams, and optical filtering means for demultiplexing one of the plurality of time domain demultiplexed wavelength streams into a single channel.

In accordance with an embodiment of the invention the optical demultiplexer further comprises splitting means for splitting the optical signal into at least two sub-signals before launching one of the sub-signals into the demultiplexing means.

In accordance with another embodiment of the present invention the optical demultiplexer further comprises clock recovery means for obtaining a clock signal from the one of the plurality of wavelength streams and for providing the clock signal to the time domain demultiplexing means for dividing the one of the plurality of wavelength streams into a plurality of time domain demultiplexed wavelength streams in dependence upon the clock signal.

The invention further provides an optical demultiplexer for demultiplexing a multiplexed N channel optical signal comprising splitting means for splitting the multiplexed N channel optical signal into a plurality of multiplexed N channel optical sub-signals, first demultiplexing means for coarse wavelength demultiplexing the plurality of multiplexed N channel optical sub-signals into M sub-signals, second demultiplexing means for time demultiplexing the M sub-signals into R sub-signals, and third demultiplexing means for wavelength demultiplexing the R sub-signals into N single channels.

In accordance with an embodiment of the invention M is a smaller number than N.

In accordance with a further embodiment of the invention, the plurality of multiplexed N channel optical sub-signals and the M sub-signals have a data rate B. The R sub-signals have a data rate C which is a lower than data rate B. Data rate B is equal to the sum of the data rates C of all the R sub-signals of one of the plurality of multiplexed N channel optical sub-signals or the M sub-signals.

In accordance with another aspect of the invention there is provided a method for demultiplexing a high bit-rate signal on a dense optical grid comprising the steps of providing the high bit-rate signal including a plurality of wavelength channels at a predetermined channel spacing to a coarse wavelength demultiplexer, performing a coarse wavelength demultiplexing for dividing the high bit-rate signal into wavelength streams broader than the predetermined channel spacing, performing an optical time domain demultiplexing for dividing at least one of the wavelength streams into a plurality of time demultiplexed streams, and filtering at least one time demultiplexed stream through a wavelength filter for obtaining at least one individual wavelength channel.

The present invention has developed a method and an apparatus for demultiplexing very high bit rate signals which are multiplexed at close channel spacing. The invention has found that a demultiplexing method combining time and wavelength demultiplexing can be achieved within the practical limits of optical and electronic technology.

In accordance with the present invention there is provided a method for demultiplexing a high bit rate signal comprising a first coarse optical frequency demultiplexing step for separating signals of groups of channels, followed by a subsequent time domain demultiplexing step for providing sufficient signal separation within each group of channels to perform a third optical frequency domain demultiplexing step separating individual channel signals.

A preferred method in accordance with the present invention comprises a method for demultiplexing a high bit rate signal on a dense optical grid comprising the steps of:

providing a signal including a plurality of wavelength channels having a predetermined channel spacing;

performing a coarse wavelength demultiplexing of wavelength streams broader than the predetermined channel spacing;

identifying a timing signal from the wavelength streams;

performing an optical time domain demultiplexing for at least one of the wavelength streams with respect to the timing signal;

filtering the at least one time demultiplexed stream through a filter to obtain an output signals having the predetermined channel spacing.

The method is further improved by initially splitting the signal into at least two streams and providing each stream into a separate coarse wavelength demultiplexer of different but overlapping wavelength ranges.

BRIEF DESCRIPTION OF THE DRAWINGS

Exemplary embodiments of the invention will now be described in conjunction with the drawings in which.

DETAILED DESCRIPTION OF PREFERRED EMBODIMENTS

Figure 1:
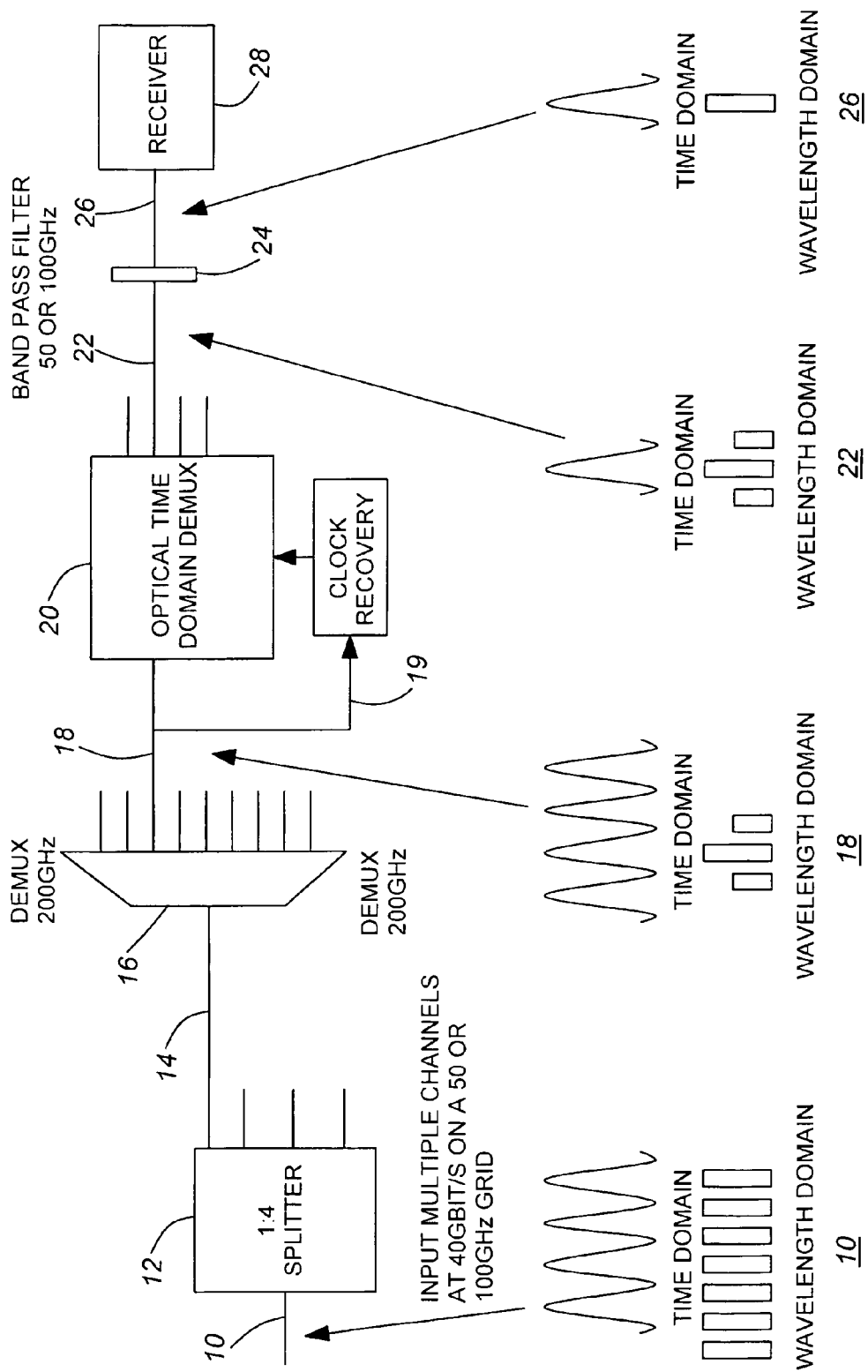
FIG. 1 is a schematic illustration of the invention shown in an exemplary scale.
Figure 1A:
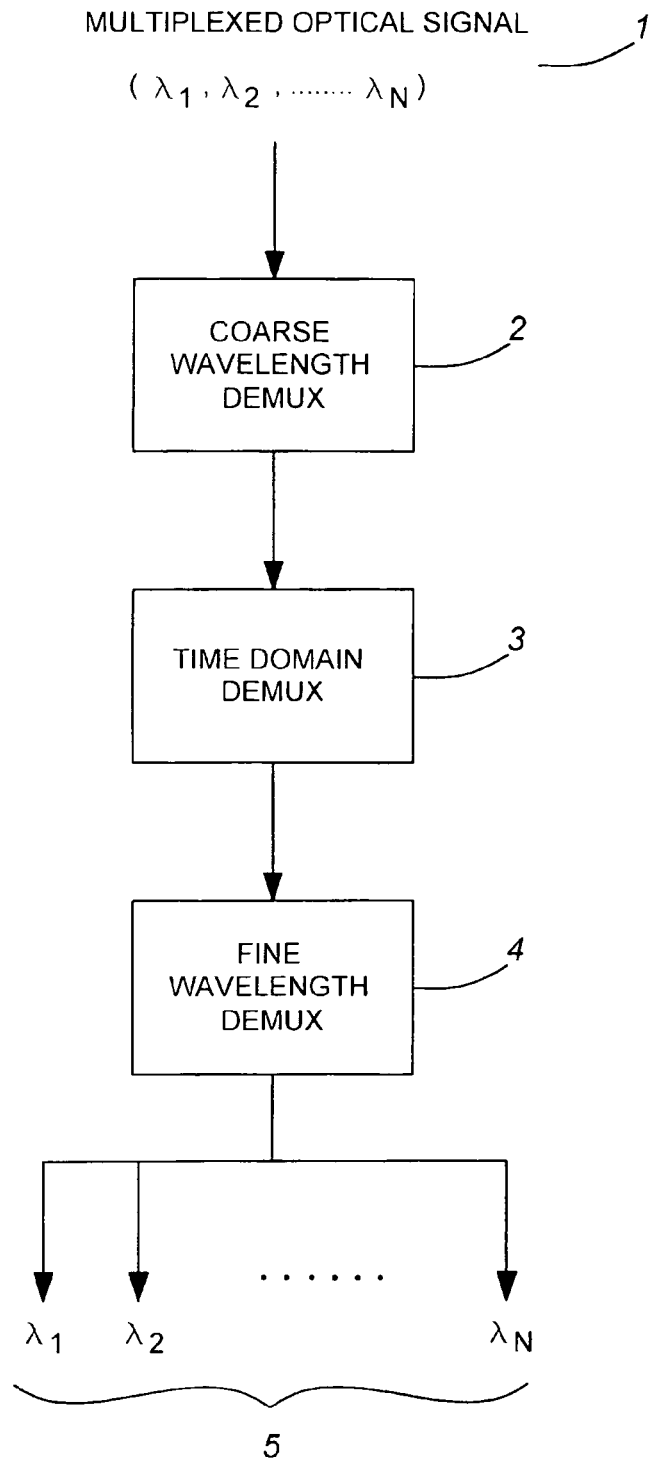
FIG. 1a is a flow chart to summarize the invention of demultiplexing a high bit-rate optical signal by triple stage demultiplexing.

Reference is now made to FIG. 1a presenting a flow chart to summarize the invention of demultiplexing a high bit-rate optical signal by demultiplexing in three stages. The first and the third stage are optical frequency domain demultiplexers and the second stage is an optical time domain demultiplexer. A multiplexed signal 1 having a plurality of wavelength channels $\lambda_1$ to $\lambda_n$ is split into a number of data streams and each one is launched into a coarse wavelength demultiplexer 2. The number of data streams required depends on the ratio of the frequency spacing of the coarse demultiplexer to the frequency spacing of the high bit-rate optical signal. The frequency spacing of the demultiplexer can be an integer or non-integer multiple of the channel spacing, but advantageously, the frequency spacing is some integral number i.e. twice the channel spacing of the high bit-rate signal. Furthermore, conveniently, the channel spacing has frequency spacing according to a standardized International Telecommunications Union (ITU) frequency grid and the demultiplexer demultiplexes the optical signal according to the standardized ITU frequency grid. In this first stage of the demultiplexing, only those wavelength channels at the coarse demultiplexer frequency spacing are selected and demultiplexed from the input optical signal. The wavelength channels that lie in between the coarse demultiplexer frequency spacing are recovered by demultiplexing the other data streams obtained by splitting the input signal before entering the coarse demultiplexer 2. The coarse wavelength demultiplexer 2 also has a demultiplexing bandwidth that is larger than the frequency spacing of the optical signal. This is necessary so that a bandwidth of the 40 GHz signal is not reduced in the demultiplexing process and all the information in the signal is retained. As a result, the signal outputs from the coarse wavelength demultiplexer 2 are not purely one wavelength channel, but a demultiplexed light output contains significant amounts of the light from adjacent wavelength channels on either side of the demultiplexed channel. Each wavelength channel output from the coarse demultiplexer 2 is then passed through an optical time domain demultiplexer 3 which divides the high bit-rate wavelength streams into a number of time domain demultiplexed streams having lower bit-rates (sub-bit-rates). The wavelength streams can be divided into any number of sub-bit-rates, however, the sum of the sub-bit-rates is equal to the bit-rate of the wavelength stream send into the time domain demultiplexer 3. The signal output from the time domain demultiplexer still contains light at the channel wavelength and the adjacent channels, however, the process of time domain demultiplexing has reduced the bit rate so that the data information is contained in a smaller bandwidth. The time domain demultiplexed streams can now be passed through a narrow band wavelength filter 4 having a linewidth that is narrower than the frequency spacing between the channels of the high bit rate optical signal but sufficiently broad to capture all the data information. In this way the wavelength-time domain demultiplexer demultiplexes the high bit rate DWDM optical signal into its separate individual wavelength channels $\lambda_1$ to $\lambda_n$, as denoted by reference numeral 5, with each wavelength channel comprising several lower bit rate channels.

Figure 2:
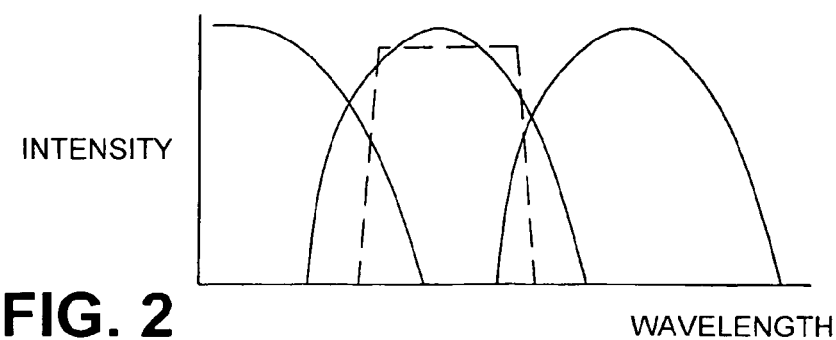
FIG. 2 is a graph illustrating exemplary signals at 40 Gbits/s and a filter response (for demonstration only) of intensity versus wavelength following a first wavelength demultiplexing step.
Figure 3:
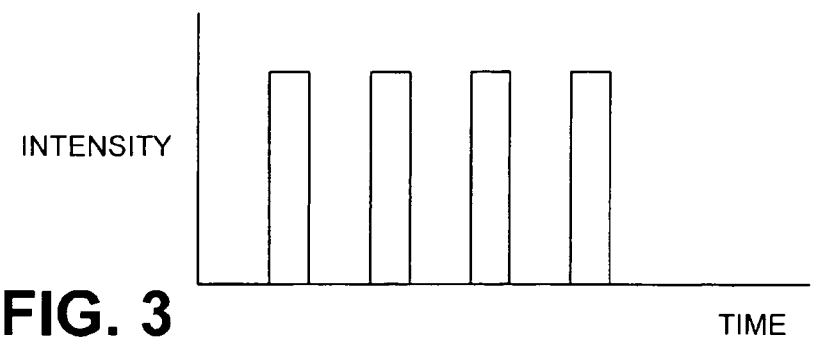
FIG. 3 is a graph illustrating exemplary signals at 40 Gbits/s of intensity versus time.

A demultiplexer in accordance with the present invention is shown schematically in FIG. 1. At 10 a signal of multiple wavelength channels at 40 Gbits/s spaced on a 50 GHz or 100 GHz optical network grid is divided by a 1:4 splitter 12 in the case of a 50 GHz channel spacing or a 1:2 splitter in the case of a 100 GHz channel spacing. As shown in FIG. 2, the linewidths of the individual wavelength channels of the optical signal overlap adjacent channels in the wavelength domain due to a high modulation rate of the optical signals. FIG. 3 shows the 40 Gbit/s signal in the time domain; the optical pulses are spaced at 25 ps intervals and have a pulse width of 12.5 ps for a return-to-zero (RZ) modulation format. In the following description of this embodiment of the invention, the channel spacing of the input signal 10 is taken as 100 GHz. An output signal 14 from the splitter 12 (1:2 in this case) is routed to a 200 GHz coarse wavelength demultiplexer 16. The coarse wavelength demultiplexer 16 demultiplexes every second wavelength channel from the optical signal input thereby producing at the outputs of the demultiplexer a sequence of wavelength channels spaced by 200 GHz. A typical 200 GHz demultiplexer has a measured bandwidth of 120 GHz and a net bandwidth of 80 GHz. FIG. 2 shows the bandwidth of a typical filter in comparison to the linewidths of the wavelength channels. Since the bandwidth of the demultiplexer 16 approaches the 100 GHz channel spacing of the optical signal 10, each wavelength channel at the output of the demultiplexer 16 contains light not only at the channel wavelength but also light from the adjacent channels spaced at 100 GHz on either side. In the wavelength domain, the output from the coarse wavelength demultiplexer 16 appears as a single wavelength at demultiplexed channel wavelength with smaller sidebands at wavelengths 100 GHz on either side of the channel wavelength. It is estimated that the 200 GHz demultiplexer attenuates the adjacent channels by only 5 to 10 dB which is insufficient isolation for the data to be detected with a low error rate.

Since the coarse wavelength demultiplexer 16 provides only one half of the wavelength channels contained in the input WDM optical signal 10, a second coarse wavelength demultiplexer, not shown in FIG. 1, connected to the other output from the optical splitter 12 is used to provide the wavelength channels located in between the channel frequencies of the coarse wavelength demultiplexer.

Figure 4:
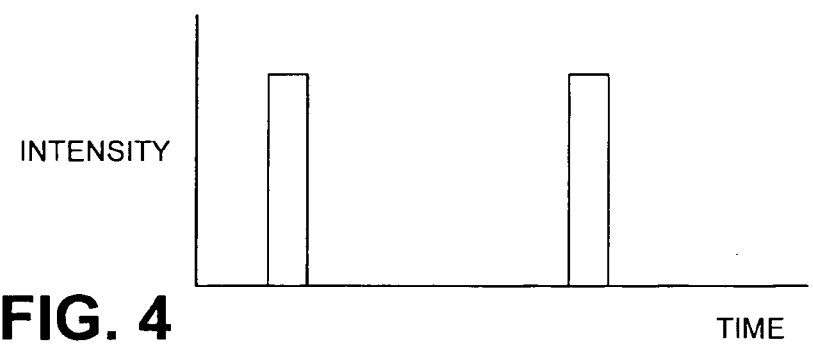
FIG. 4 is a graph illustrating the signal of FIG. 3 following the time domain demultiplexing step; and, FIG. 5 is a graph illustrating the signal and the filter response of FIG. 2 following a final wavelength demultiplexing step.
Figure 5:
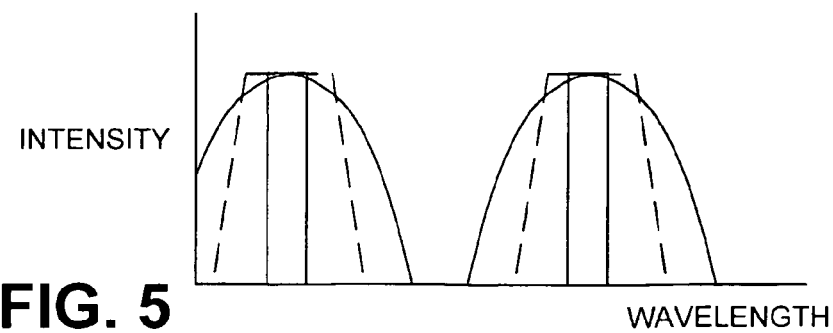

Each output signal 18 from the coarse wavelength demultiplexer 16 is routed to an optical time domain demultiplexer 20. FIG. 3 shows the optical signal in the time domain before entering the optical time domain demultiplexer. A number of technologies exist for realizing the optical time domain demultiplexer function, such as LiNbO$_3$ modulators and semiconductor optical amplifier switches. Before entering the time domain demultiplexer 20, a portion of the signal 18 is tapped off in order to provide a means to recover the clock frequency 19 for the 40 Gbit/s signal. Although the signal-to-noise ratio in the tapped light signal is too low to permit an error free recovery of the data, it is sufficiently high to permit the recovery of the clock frequency, which is used to trigger the optical time domain demultiplexer 20. The time domain demultiplexer 20 demultiplexes the input signal or wavelength stream 18 into several time domain demultiplexed wavelength streams having a lower bit-rate than the input wavelength stream 18. The sum of the bit-rates of these lower bit rate channels equals the bit-rate of the input data stream 18 to the time domain demultiplexer 20. For example, the 40 Gbit/s data stream shown in FIG. 3 is demultiplexed into four 10 Gbit/s data streams, i.e. the time domain demultiplexed wavelength streams. One of these lower bit-rate 10 Gbit/s data streams is shown in FIG. 4; the pulse width is still 12.5 ps, but the pulse separation is now 100 ps. In the wavelength domain, the bandwidth of one of these 10 GHz data streams still has a 80 GHz bandwidth at the channel wavelength and residual side bands spaced at 100 GHz on either side of the channel wavelength. However, because the data rate is now only 10 Gbit/s (RZ signal bandwidth 20 GHz) as compared to 40 Gbit/s data rate (RZ signal bandwidth 80 GHz), the adjacent channels can be removed using a narrow band filter 24 without losing any data. Therefore the output signal 22 from the optical time domain demultiplexer 20 is passed through a narrow band optical band pass filter 24 having a bandwidth sufficiently small to remove the optical signal in the adjacent channels. This filtering action is illustrated in FIG. 5. The demultiplexed signal 26 from each filter 24 passes to a receiver 28 where the data is recovered without any loss of information.

What is claimed is:

1. An optical demultiplexer for demultiplexing an optical signal having a plurality of wavelength channels, wherein a centre wavelength of each of said channels is separated by a predetermined channel spacing, comprising:
    (a) wavelength demultiplexing means for receiving the optical signal and for dividing the optical signal into a plurality of demultiplexed wavelength streams having a wavelength separation therebetween larger than the predetermined channel spacing and, wherein at least one of the demultiplexed wavelength streams has more than one wavelength channel for carrying data;
    (b) time domain demultiplexing means for receiving one of the plurality of demultiplexed wavelength streams and for dividing the one of the plurality of wavelength streams into a plurality of time domain demultiplexed signals each comprising the plurality of wavelength streams; and
    (c) optical filtering means for wavelength demultiplexing the time domain demultiplexed signals into separate wavelength channels.

2. The optical demultiplexer as defined in claim 1 further comprising splitting means for splitting the optical signal into at least two sub-signals before launching one of the sub-signals into the demultiplexing means.

3. The optical demultiplexer as defined in claim 2 further comprising clock recovery moans for obtaining a clock signal from the one of the plurality of wavelength streams and for providing the clock signal to the time domain demultiplexing means for dividing the one of the plurality of wavelength streams into a plurality of time domain demultiplexed wavelength streams in dependence upon the clock signal.

4. The optical demultiplexer as defined in claim 3 comprising a plurality of time domain demultiplexing means and a plurality of optical filtering means, said plurality of time domain demultiplexing means for receiving the plurality of wavelength streams and for dividing the plurality of wavelength streams into a plurality of time domain demultiplexed wavelength streams, and each of said plurality of optical filtering means for demultiplexing each of the plurality of time domain demultiplexed wavelength streams into a single channel.

5. The optical demultiplexer as defined in claim 3 wherein a frequency spacing of the demultiplexing means is one of an integer multiple and a non-integer multiple of the predetermined channel spacing.

6. The optical demultiplexer as defined in claim 5 wherein the integer multiple is two.

7. The optical demultiplexer as defined in claim 6 wherein the demultiplexing means demultiplexes the optical signal according to a standardized International Telecommunications Union (ITU) frequency grid.

8. The optical demultiplexer as defined in claim 6 wherein the predetermined channel spacing is a frequency spacing according to a standardized International Telecommunications Union (ITU) frequency grid.

9. The optical demultiplexer as defined in claim 6 wherein the time domain demultiplexing means is one of a lithium niobate (LiNbO$_3$) modulator and a semiconductor optical amplifier switch.

10. The optical demultiplexer as defined in claim 9 wherein the optical filtering means is a band-pass filter.

11. The optical demultiplexer as defined in claim 10 wherein the optical signal has a return to zero (RZ) modulation format.

12. The optical demultiplexer as defined in claim 5 wherein a sum of bit-rates of the plurality of time domain demultiplexed wavelength streams as equal to a bit-rate of the one of the plurality of wavelength streams.

13. An optical demultiplexer for demultiplexing a multiplexed N channel optical signal comprising:
  a splitter for splitting the multiplexed N channel optical signal into a plurality of multiplexed N channel optical sub-signals;
  first wavelength demultiplexing means for coarse wavelength demultiplexing the plurality of multiplexed N channel optical sub-signals into M sub-signals, wherein at least one of the M sub-signals comprises more than one wavelength channel;
  second time demultiplexing means for separating the M sub-signals which comprise more than one wavelength channel into R sub-signals, wherein the R sub-signals comprise the same wavelength channels; and
  third demultiplexing means for wavelength demultiplexing the P sub-signals into N single channels.

14. The optical demultiplexer as defined in claim 13 further comprising clock recovery means for extracting a clock signal from the M sub-signals for demultiplexing the M sub-signals into the R sub-signals in dependence upon the clock signal.

15. A method for demultiplexing a high bit-rate signal on a dense optical grid comprising the steps of:
  providing the high bit-rate signal including a plurality of wavelength channels for carrying data at a predetermined channel spacing to a coarse wavelength demultiplexer;
  performing a coarse wavelength demultiplexing for dividing the high bit-rate signal into demultiplexed wavelength streams having a wavelength separation therebetween larger than the predetermined channel spacing and, wherein at least one of the demultiplexed wavelength streams has more than one wavelength channel for carrying data;
  performing art optical time domain demultiplexing for dividing at least one of the demultiplexed wavelength streams into a plurality of time demultiplexed signals each comprising the plurality of wavelength streams; and
  filtering at least one little demultiplexed signal through a wavelength filter for obtaining at least one individual wavelength channel.

16. The method as defined in claim 15 further comprising the step of identifying a timing signal from the wavelength streams for performing an optical time domain demultiplexing for at least one of the wavelength streams in dependence upon the timing signal.

17. The method as defined in claim 15 further comprising the step of initially splitting the high bit-rate signal into at least two streams and providing each stream into a separate coarse wavelength demultiplexer of different but overlapping wavelength ranges.

* * * * *

UNITED STATES PATENT AND TRADEMARK OFFICE
CERTIFICATE OF CORRECTION

PATENT NO. : 7,167,650 B2
APPLICATION NO. : 09/886998
DATED : January 23, 2007
INVENTOR(S) : Farries It is certified that error appears in the above-identified patent and that said Letters Patent is hereby corrected as shown below:

Col. 8, line 15, ""art" should read -- an --

Col. 8, line 20, "little" should read -- time --

Signed and Sealed this

Twenty-seventh Day of November, 2007

JON W. DUDAS
*Director of the United States Patent and Trademark Office*